No. 723,772. PATENTED MAR. 24, 1903.
L. C. H. CHARRIER.
WOOD CARVING MACHINE
APPLICATION FILED APR. 9, 1901.
NO MODEL. 10 SHEETS—SHEET 1.

No. 723,772. PATENTED MAR. 24, 1903.
L. C. H. CHARRIER.
WOOD CARVING MACHINE.
APPLICATION FILED APR. 9, 1901.
NO MODEL. 10 SHEETS—SHEET 3.

No. 723,772. PATENTED MAR. 24, 1903.
L. C. H. CHARRIER.
WOOD CARVING MACHINE.
APPLICATION FILED APR. 9, 1901.
NO MODEL. 10 SHEETS—SHEET 5.

WITNESSES:
Isabella Waldron
Adelaide Claire Gleason

INVENTOR.
Leon Constant Henri Charrier
BY Richards & Co
ATTORNEYS

No. 723,772. PATENTED MAR. 24, 1903.
L. C. H. CHARRIER.
WOOD CARVING MACHINE.
APPLICATION FILED APR. 9, 1901.
NO MODEL. 10 SHEETS—SHEET 6.
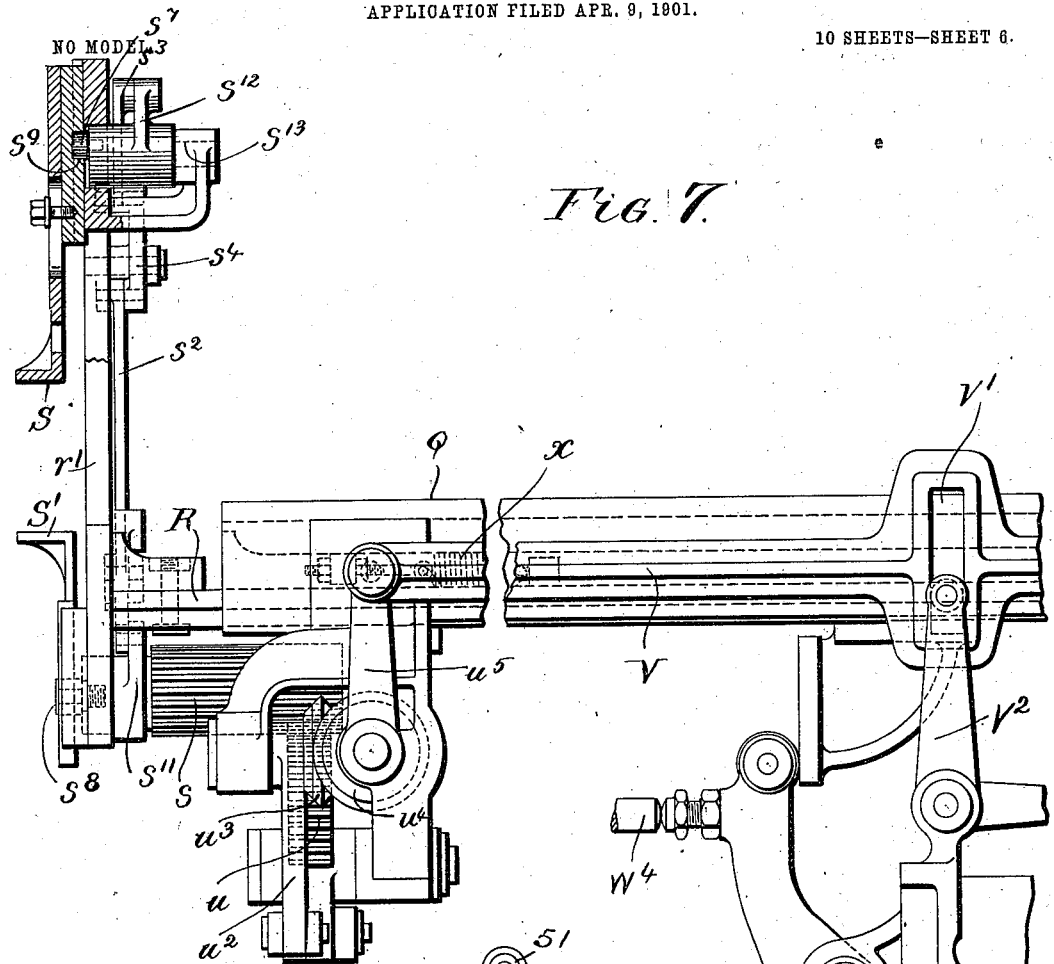
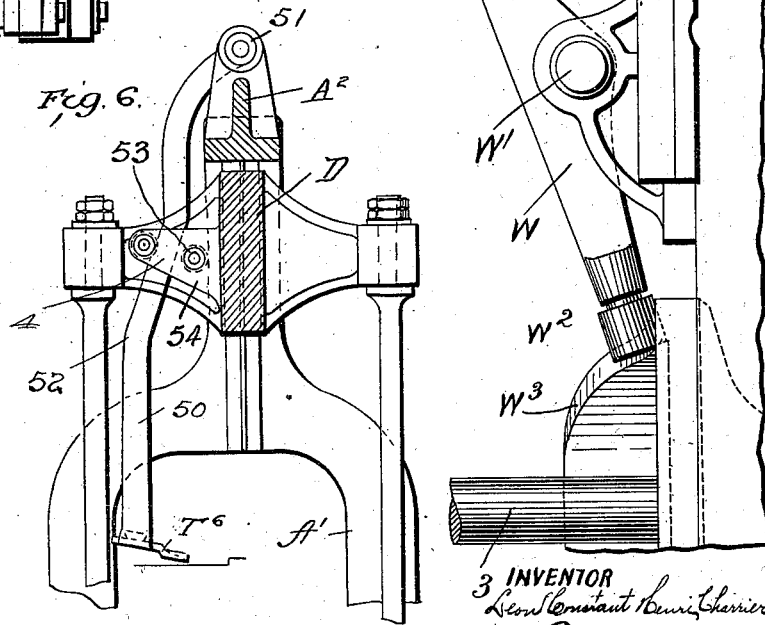

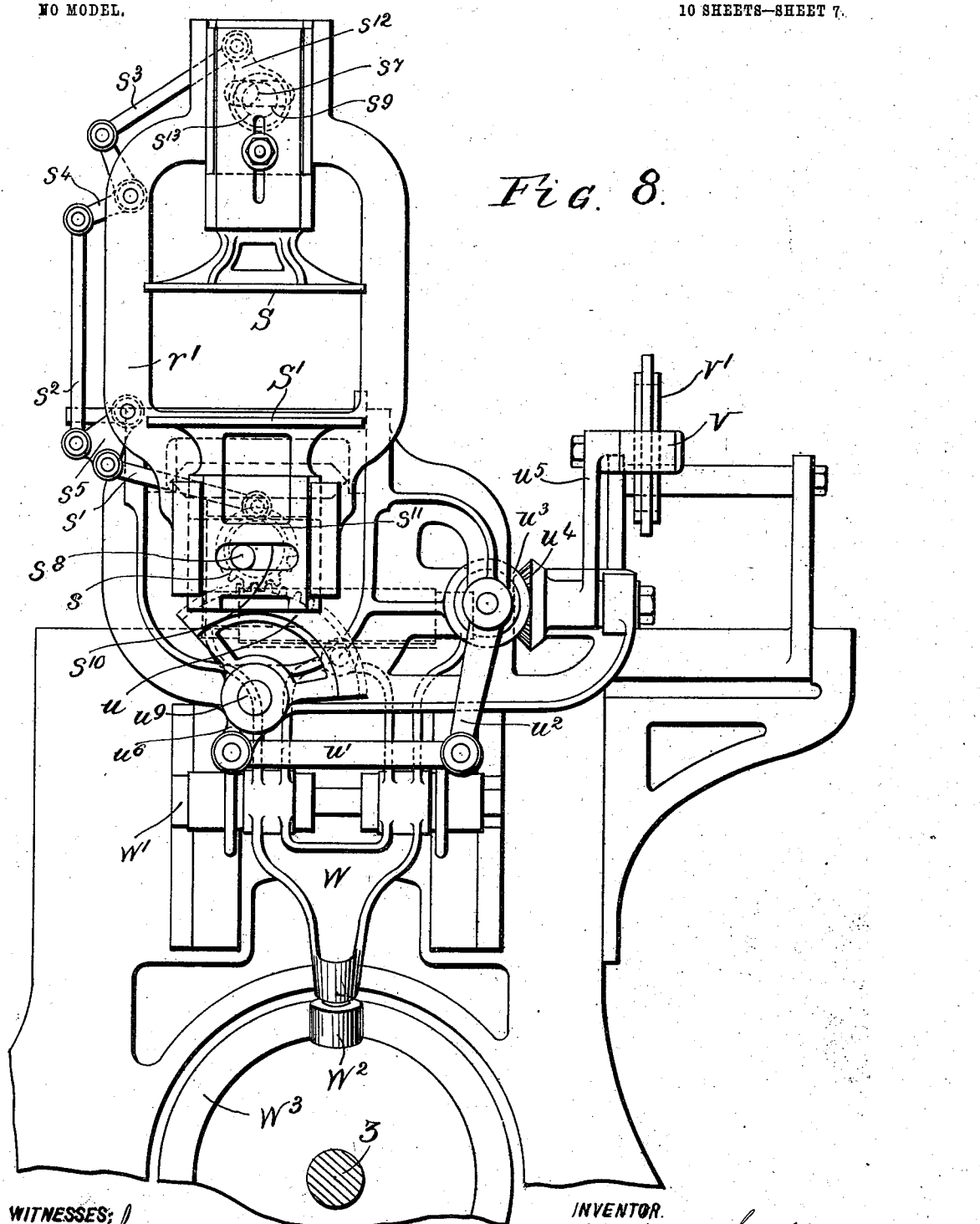

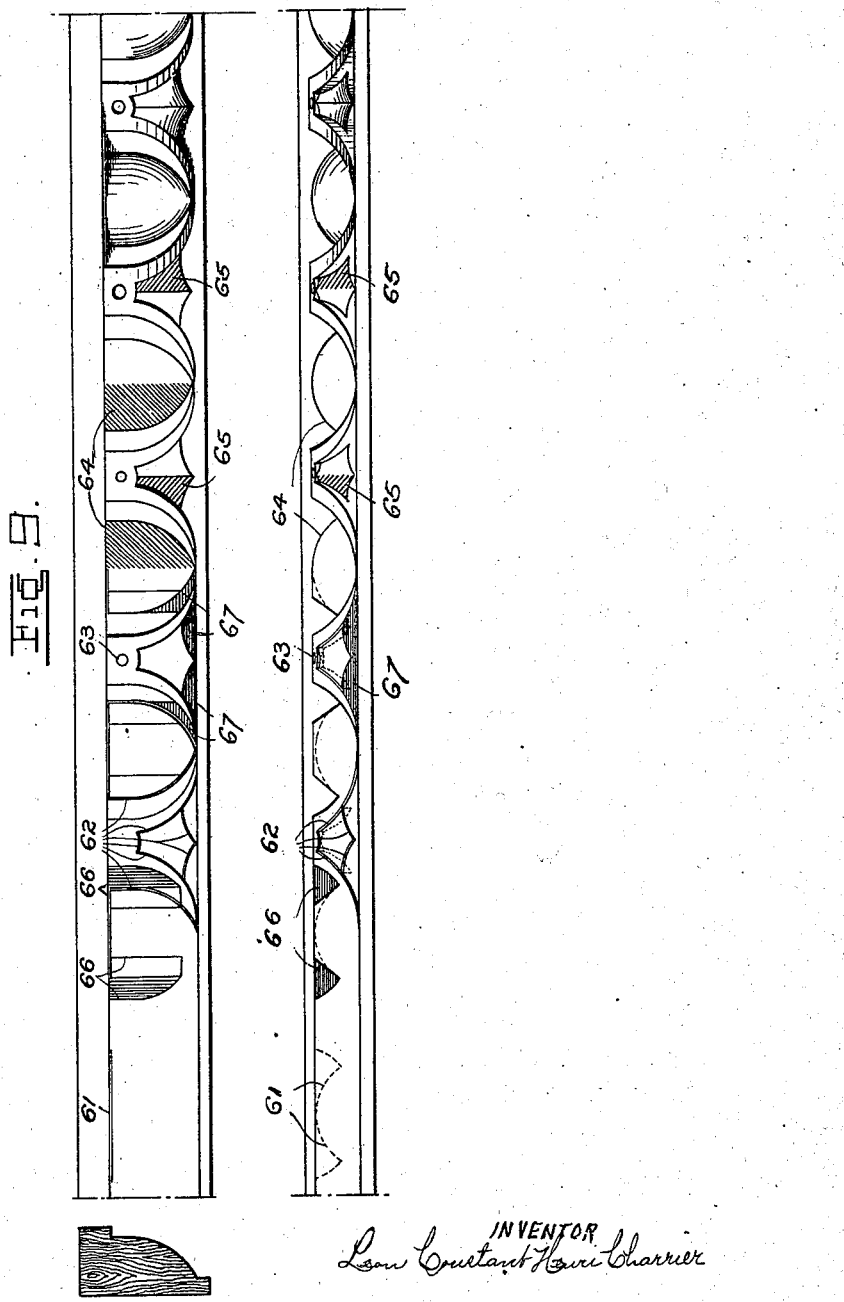

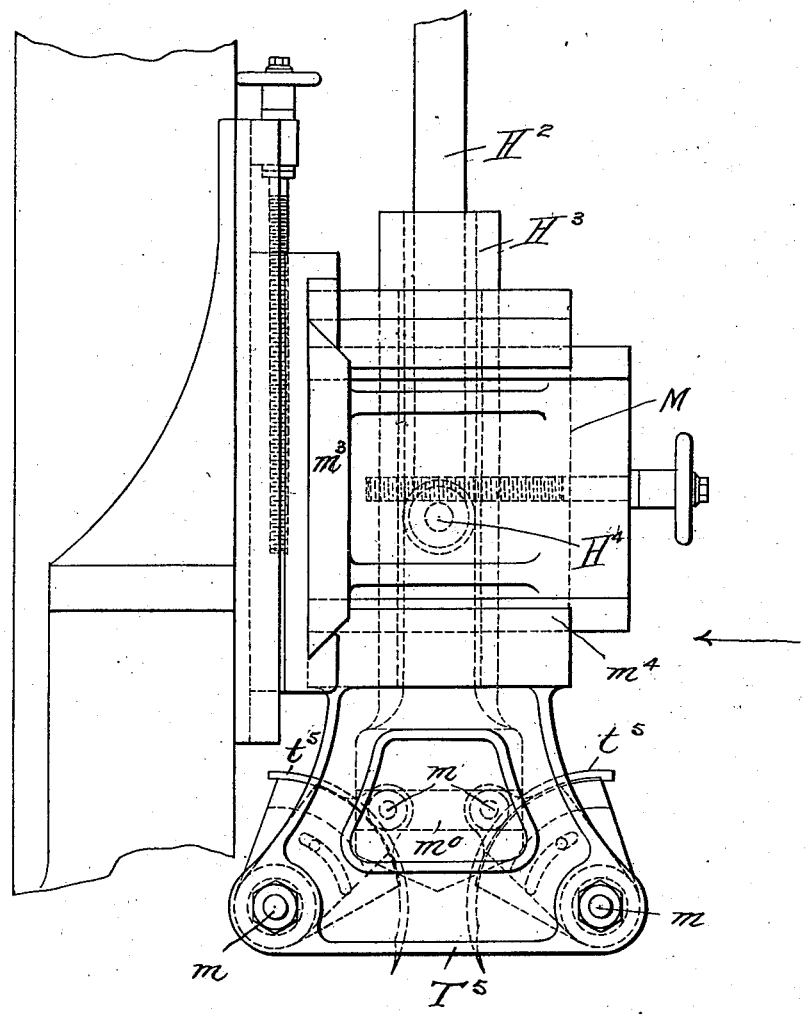

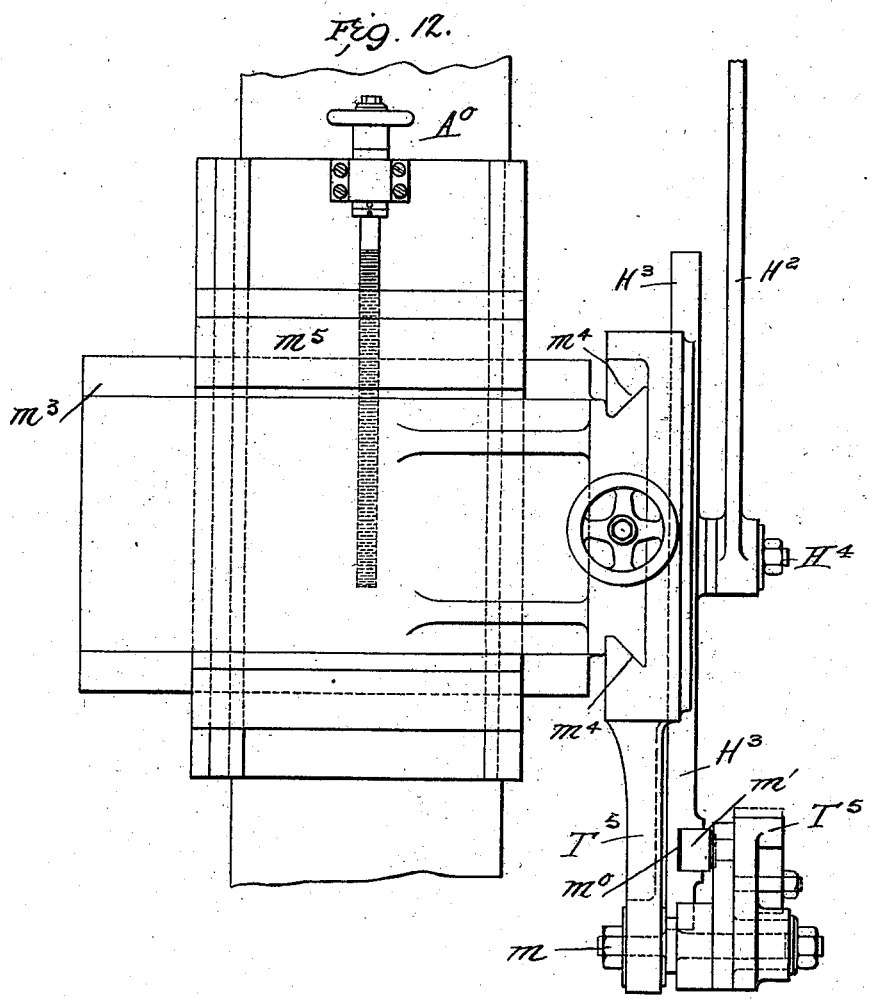

UNITED STATES PATENT OFFICE.

LEON CONSTANT HENRI CHARRIER, OF VENDÔME, FRANCE, ASSIGNOR TO THE BRITISH CHARRIER WOOD CARVING COMPANY, LIMITED, OF LONDON, ENGLAND.

WOOD-CARVING MACHINE.

SPECIFICATION forming part of Letters Patent No. 723,772, dated March 24, 1903.

Application filed April 9, 1901. Serial No. 55,041. (No model.)

*To all whom it may concern:*

Be it known that I, LEON CONSTANT HENRI CHARRIER, a citizen of the Republic of France, and a resident of Vendôme, Loir-et-Cher, in the Republic of France, have invented certain new and useful Improvements in Wood-Carving Machines, of which the following is a specification.

This invention relates to wood-carving machines of the kind described in Patent No. 553,393, granted to L. C. H. Charrier.

The object of this invention is to provide an improved construction of such machine wherein the various operations are performed in a more efficient manner with great certainty and in such manner as to increase the output of the machine. To this end and according to my invention I provide the machine with a suitably supported and counterbalanced reciprocating beam which is adapted to carry a number of independently-working tools and pressers, while the said beam also serves to actuate other tools carried by the frame of the machine above the table, and the said beam also acts in conjunction with a movable part of the frame below the work to actuate other tools and also to automatically clear said tools from the work independently of the movement of the beam in order to be clear of the tools at the proper time. I also provide the machine with mechanism adapted to so coact with the other parts of the machine that the work is fed with greater ease and accuracy.

I will now describe the improved machine with reference to the accompanying drawings, in which—

Figure 1:
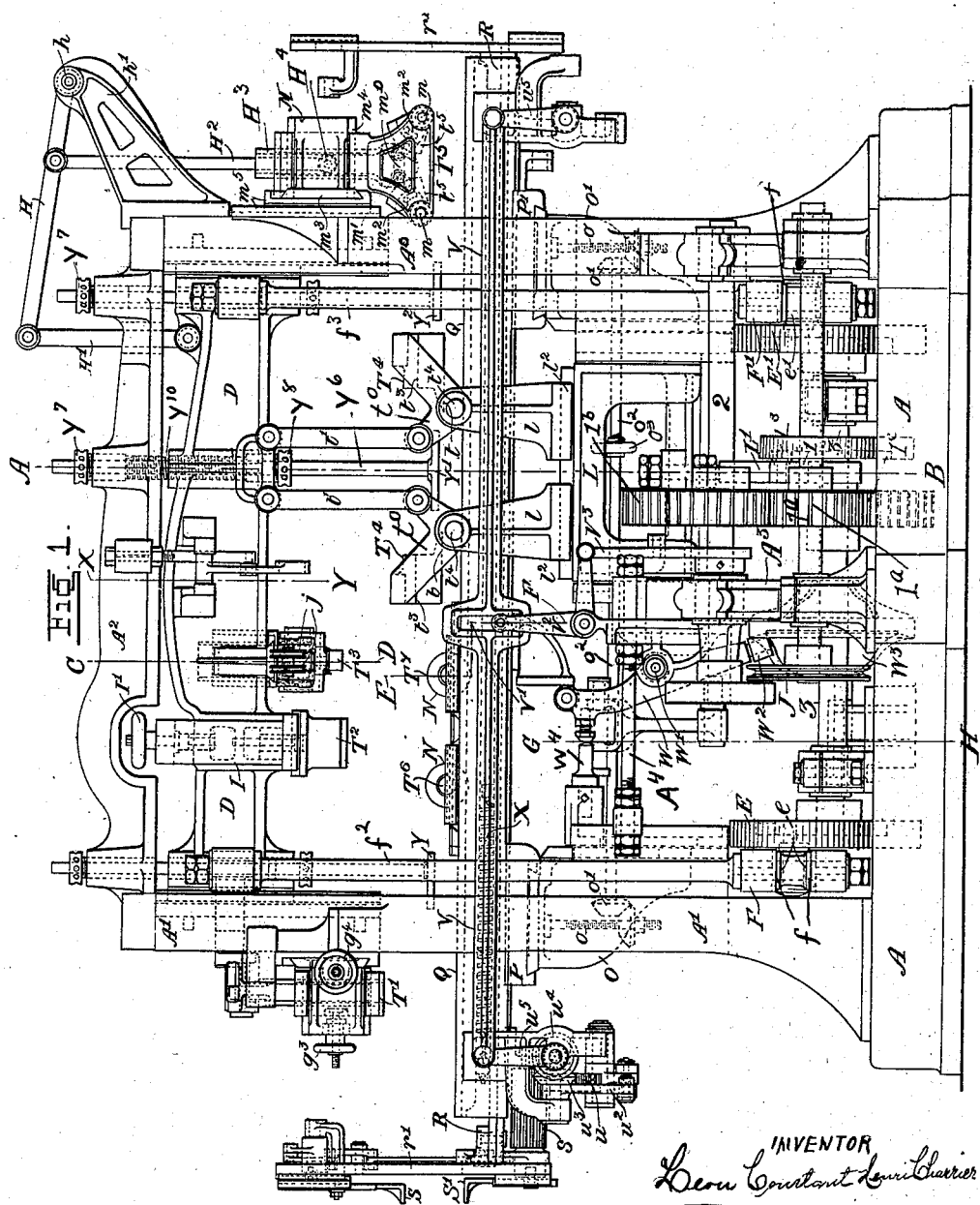
Figure 2:
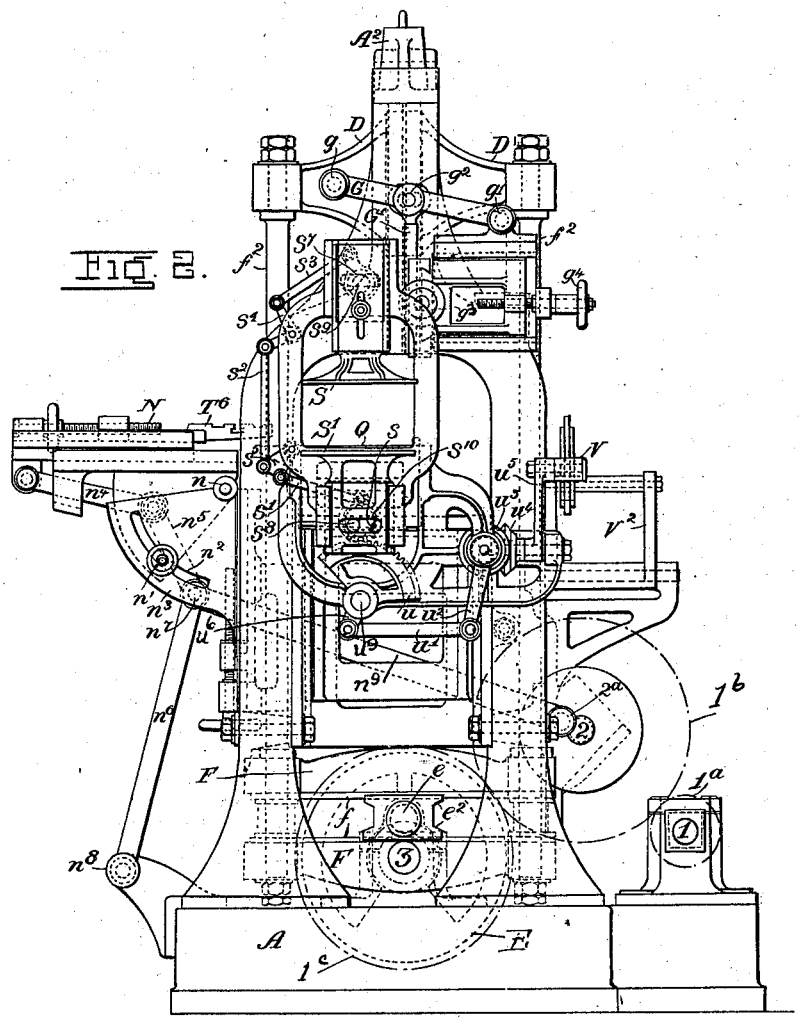
Figure 3:
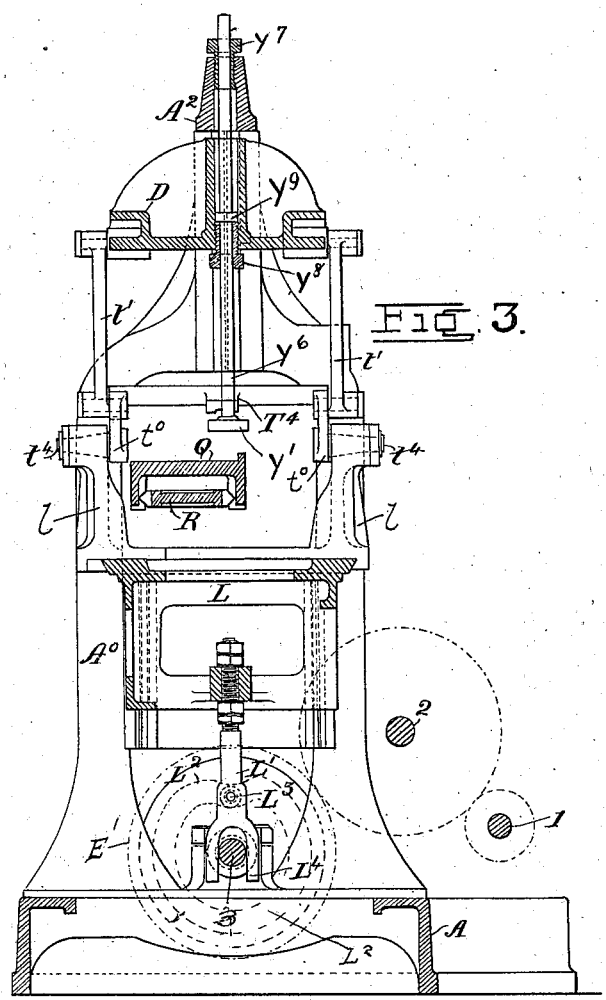
Figure 4:
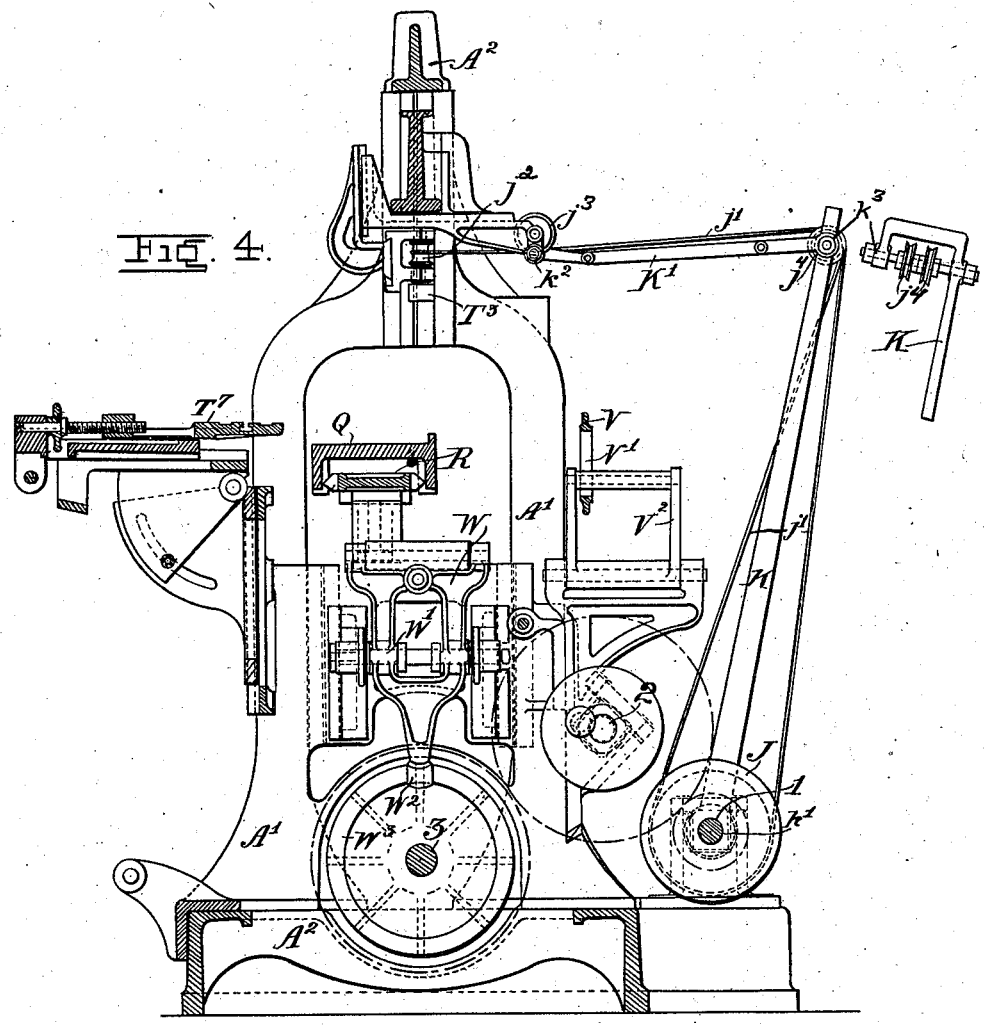
Figure 5:
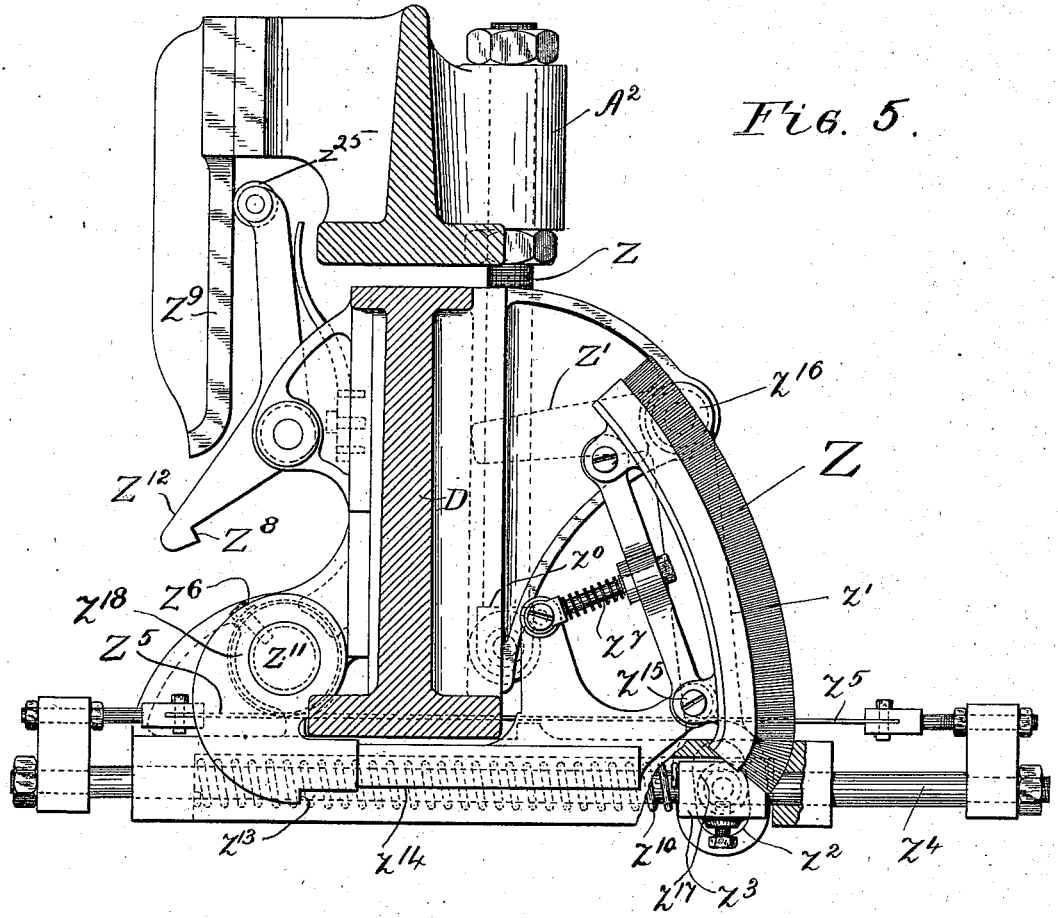
Figure 10:
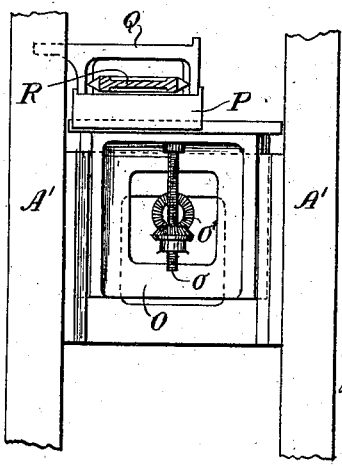

Figure 1 is a front elevation of the complete machine. Fig. 2 is an end view looking from the left. Figs. 3 and 4 are cross-sections of Fig. 1, respectively on lines A B and C D, E F G H. Fig. 5 is also a section of part of this figure on the line X Y. Fig. 6 shows a modified arrangement for actuating the side tools. Figs. 7 and 8 are enlarged views of the feed mechanism shown in Figs. 1 and 2, and Fig. 9 shows one kind of carved molding produced by the machine. Fig. 10 is an end view of the transverse carriages and work-table. Fig. 11 is an enlarged detail elevation of the tool-holders $T^5$, and Fig. 12 is an elevation of the same looking from the direction of the arrow in Fig. 11.

A is a base-plate, of cast-iron, upon which the machine rests.

$A^0$ $A'$ are standards connected by a longitudinal bar $A^2$ at their upper ends, which serves to keep them parallel.

$A^3$ is a smaller standard or bracket fixed to the base-plate and connected by a stay-piece $A^4$ to the standard $A'$.

D is the reciprocating beam, of cast-steel or other suitable metal, which receives a reciprocating motion from disks E E' through suitable cross-heads F F', the said cross-heads having transverse guides $f$, in which slide blocks $e^2$, carrying the crank-pins $e$ and $e'$. The cross-heads are connected to the beams D by side rods $f^2 f^3$. Upon the main driving-shaft 1 is fixed a toothed wheel $1^A$, which gears with a tooth-wheel $1^b$ upon the shaft 2. In gear with $1^b$ is the tooth-wheel $1^c$, which is fixed on the shaft 3. Upon the shaft 3 are keyed the crank-disks E E', which are connected to the reciprocating beam D by the side rods $f^2 f^3$. In operation the rotation of the driving-shaft 1 causes the beam D to reciprocate.

The beam D carries the tool-holders $T^2$, $T^3$, and $T^4$. The tool-holders $T'$ and $T^5$ are guided upon the standards $A^0$ $A'$ and are actuated from the beam D, the one $T'$ by connecting-levers G G', the lever G being pivoted at $g$ to the beam and at $g'$ to the frame, while the lever G', which is connected to the tool, is also connected to the lever G at $g^2$ by a pin-and-slot connection. This tool serves for impressing or indenting certain parts of the work, and the holder $T'$ is adjusted as to position by slides and set-screws $g^3$ $g^4$. The tool-holder $T^5$ is actuated through the levers H and rods H' H², the lever being centered at one end, as at $h$, to a bracket $h'$ upon the frame $A^0$. In operation the tools in holders $T^2$ $T^3$ are brought down onto the molding to be carved by the descent of the beam D, and tools in holders $T'$ $T^5$ are actuated by the same downward movements on the beam through the levers G G' and levers H H' H², respectively. The tool-holder $T^2$ is carried by a part I, which is adapted to slide in a suitable guideway in beam D and is made adjustable to the work by means of a hand-screw I'. The tool-holder T³ comprises a chuck adapted to be rotated at a high speed— say fifteen hundred to two thousand revolutions per minute—and is driven by a pulley J on the main shaft 1, which is connected by a band $j'$ (see Fig. 4) with a pulley $j^2$ on the tool-spindle, the band passing over idle pulleys $j^3 j^4$. This band $j'$ is kept at a constant tension and length during the movement of the beam D by means of a bent lever K K', pivoted or centered at $k'$ on the shaft 1 and at $k^2$ to the beam D. This lever K K' is hinged at $k^3$ to accommodate itself to the movement of the belt $j'$, which is of round section.

Referring now to the tool-holders T⁴ T⁴, (shown clearly in Fig. 1,) these are carried by bell-crank levers, which are pivoted at $t^4 t^4$ to the brackets $l l$, carried by and adapted to slide at $l^2$ upon a table L, which is actuated as hereinafter described. The holders T⁴ T⁴ extend through the machine, and the tools $t t$ are attached at $t^3 t^3$.

In operation the descent of the beam D acts through connecting-bars $t' t'$ to rock the bell-crank levers $t^0$, carrying said holders T⁴ T⁴ upon the center $t^4$, and so cause the tools $t t$ to receive a curved motion for cutting longitudinally convex portions of the work. The dimensions of the curves are determined by the position of the tools in regard to the center $t^4$ about which they turn. In order that these tools may be properly cleared from the work, so as to allow the same to be fed forward at the proper time, the table L is adapted to receive an intermittent vertical reciprocating motion independently of the beam D, this motion raising the centers $t^4$ and the tools from the work at the proper time. (See Fig. 3).

The table L is operated by a bar L', reciprocated by a cam L² through a pin or friction wheel L³. The bar L' is slotted, as at L⁴, so as to pass over the shaft 3, which serves to keep the bar L' vertical during its movement.

In operation the table L is raised by the bar L' and the cam L² on the shaft 3 immediately after the tools in the holder T⁴ have made their cuts, and the table is lowered by the same means just before these tools again come into operation. The tool-holder T⁵ is mounted on a carriage M, adapted to be adjusted in three directions — namely, transversely, longitudinally, and vertically — by sliding parts $m^3 m^4 m^5$, respectively. The part $m^5$ is guided vertically in the standards A⁰, and the part $m^3$ is transversely adjustable in guides formed in part $m^5$ and carries guides $m^4$, by which the tool-holder is supported, so as to be longitudinally movable. The said holder carries tools $t^5 t^5$, which are in the form of two sectors. The sectors are centered at $m m$ on T⁵ and are connected by pins $m'$ to a sliding part H³, said pins $m'$ traveling in a slot $m^0$ on the part H³. The sliding part H³ is connected by a pin H⁴ to the lever H². In operation on the descent of the beam D the sliding part H³ is caused to descend by the levers H H' H², and thereby the tools $t^5 t^5$ are caused to turn on the pivots $m m$ and make the cut 65, the tools serving to cut concave longitudinal portions of the work. Suitable guiding-slots, such as $m^2$, are provided.

T⁶ and T⁷ are tool-holders which carry two horizontally-working tools. (See Fig. 2.) The holders are rendered adjustable by hand-screws N N, and to allow of angular adjustment of the tool the holders are pivoted at $n$ and held in position by a bolt $n'$ passing through slot $n^2$ in a bracket $n^3$. The holders and tools are moved to and from the work by a bell-crank lever comprising short arm $n^5$ and a long arm $n^9$. The longer arm $n^9$ of the bell-crank lever forms a connecting-rod actuated by a crank $2^a$ on the shaft 2, and its shorter arm is connected to the tool-holder T⁶ by the link $n^4$, so as to reciprocate the same, while the motion is properly determined by a guiding-link $n^6$, pivoted at $n^7$ and pivoted on the lower part of the frame, as at $n^8$. One set of links and levers $n^4 n^5 n^6$ may serve to actuate both the tool-holders T⁶ T⁷.

Instead of the means shown in Fig. 2 I may employ any suitable arrangement of levers for imparting the required reciprocating movement to the tool-holders T⁶ T⁷.

Referring now to the coöperating mechanism for feeding the work to the machine, as shown in Figs. 1 and 10, O O' are two carriages mounted in the standards A' A⁰ and having a vertical motion, being actuated by means of screw-spindles $o$, driven by bevel-gear $o'$ and shaft $o^2$, said shaft $o^2$ being provided with a hand-wheel $o^3$ for adjusting the position of the carriages O O'.

P P' are transversely-movable carriages, which are supported upon the carriages O O' and move together therewith. Upon the carriages P P' is mounted a table Q, of cast-iron or other suitable material, upon which the molding or work moves or rests. This table is fixed to the carriages P P', so that by the adjustment of the carriages O O' it is possible to adjust the height of the table in regard to the tools, so as to suit moldings of different dimensions. The tools always work, as described, at or about the same height.

R is a feed-bar sliding with slight friction or on rollers within the under side of the table Q. This bar R is provided at each end with a frame $r'$, which supports and guides claws or gripping-plates S S'. The lower plate S' is provided with a slot $s^{10}$.

$s$ is a pinion provided with an eccentric-pin $s^3$, adapted to work in slot $s^{10}$.

$u$ is a toothed quadrant mounted on a pivot $u^9$ and engaging the pinion $s$.

$u^3$ is a beveled pinion carrying an arm $u^2$, which is connected to an extension $u^6$ of the quadrant $u$ by a link $u'$.

$u^4$ is a beveled pinion engaging with pinion $u^3$ and carrying arm $u^5$.

V is a longitudinal bar which is connected by a pin to the arms $u^5$ $u^5$ at both ends of the table. This bar is provided at its center with a slot or groove V', arranged so as to allow a vertical movement of the bar V when the table Q is raised or lowered. The horizontal bar V is adapted to receive a to-and-fro motion from a bell-crank lever $V^2$, actuated through a connecting-rod $V^3$ from a cam disposed, but not shown, on the shaft 2. Upon the same center as the pinion $s$ and turning with it is a bracket $s^{11}$, which is connected to the bell-crank levers $s^5$ $s^4$ by the links $s'$ and $s^2$. The bell-crank lever $s^4$ is connected by the link $s^3$ to the arm $s^{12}$, which turns on the pivot $s^{13}$. The arm $s^{12}$ is provided with an eccentric-pin $s^7$, which works in a slot $s^9$ in the sliding part of the upper jaw S.

In operation the bar V receives a horizontal reciprocating motion through the crank-lever $V^2$, the rod $V^3$ and cam on shaft 2. (Not shown.) This movement of the bar V actuates the arm or lever $u^5$ and causes the pinions $u^4$ $u^3$ to partly rotate on their respective pivots. The lever $u^2$, mounted on the pinion $u^3$, is thereby moved, and with it the link $u'$ and quadrant $u$. The motion of the quadrant $u$ causes the pinion $s$ to rotate, and the eccentric-pin $s^8$, mounted thereon, raises the lower gripping-jaw S'. The movement of the pinion $s$ also actuates the arm $s^{12}$ through the links and levers $s'$ $s^5$ $s^2$ $s^4$ $s^3$, thereby causing the eccentric-pin to travel in the slot $s^9$ and lower the upper gripping-jaw S. On the completion of the revolution of the cam on shaft 2 the jaws S S' are opened by the reverse action of the levers described.

When the jaws S S' are tightened onto the work, any horizontal motion given to the bar R will cause the work to travel forward. The horizontal motion of the bar R is produced by means of a lever W, Figs. 1, 7, and 8, pivoted at W' and having at its lower end a roller $W^2$, actuated by a cam-like plate $W^3$ of suitable shape, mounted on and driven by shaft 3. When the claws S S' are released, the return movement of the feed-bar and other parts of the feed mechanism is effected by a spring or counterweight X. (Shown by dotted lines in Figs. 1 and 7.)

The forward movement of the lever W is determined by the stop $W^4$, which is made adjustable or is adapted to be replaced by others of different dimensions. By thus determining the motion of the lever W the length of the feed is adjusted to set the particular work in the machine.

In order that the work may be efficiently held while the tools are operating, several pressers Y Y' $Y^2$, having springs, are provided. The pressers Y Y' $Y^2$ consist of a spindle or rod $Y^6$, passing up through holes in the reciprocating beam D and top frame $A^2$. The said holes are enlarged and provided with a screwed collar $Y^7$ and screwed sleeve $Y^8$. The spindle or rod is formed with a shoulder, as at $Y^9$, between which and the screwed collar $Y^7$ a spring $Y^{10}$ is fitted. In operation, assuming the beam D to be at the top of its stroke, as shown in Fig. 1, the shoulder will rest upon the sleeve $Y^8$ and hold the presser a short distance above the work; but as soon as the beam D commences to descend the presser will engage the work and the continued movement of the beam D will compress the spring $Y^{10}$ and so cause the presser to grip and hold the work.

The operation of the machine is as follows: The strip or molding to be carved is fed into the left-hand side of the machine. The jaws S S' grip the molding and feed same forward over the table Q, the bar R moving with the feed-jaws at both ends. The molding is then clamped by the presser and acted upon successively at each interval between the movement of the feed by the tools T' to $T^5$ and the intermediate side tools $T^6$ $T^7$. As soon as the molding has reached the last tool $T^5$ the operation will take place at one time, although on different portions of the work, the latter passing away from the tool $T^5$ in a finished state.

The means by which the tools are actuated having been already described I will for clearness describe the action of the successive tools in carving the pattern shown in Fig. 9, although the said tools are of the same shape and work in the same successive order as those described in the previous patent referred to. Taking the tools in rotation, T' makes a vertical cut, (marked 61,) then $T^6$ cuts the V-groove 66. $T^2$ then cuts the pattern by vertical lines 62. The side tool $T^7$ makes a horizontal cut, so as to remove the part 67 previously cut vertically by the tool $T^2$. $T^3$ then drills the holes 63. $t$ $t$ then cut the convex parts 64 64. $T^5$ finishes the pattern by cutting out the slightly-concave parts 65.

Fig. 6 is a modified arrangement of side tool—such as $T^6$ $T^7$, Fig. 1. D is the reciprocating beam, provided with an arm or projecting part 54, on which are mounted two friction-rollers 53. 50 is an arm or lever bent as at 52 and centered at 51 on the part $A^2$ of the frame and adapted to pass between the friction-rollers 53 and having at its lower end a tool 5. In operation the vertical movement of the beam D causes the tool $T^6$ to make the side cut 66, Fig. 9.

Fig. 5, which is a section on line X Y, shows the brush Z for cleaning the molding before the operation of the cutters $t$ $t$. The brush Z is mounted at $z^{15}$ on an arm $z^{14}$, which is adapted to turn on a pivot $z^{11}$ on the beam D. $z^4$ is a sliding rod upon which is mounted a block $z^3$ and friction-roller $z^{17}$. $z'$ is a bell-crank lever pivoted at $z^{16}$ on the beam D, having a slot $z^2$ on one arm, which engages a friction-roller $z^{17}$. $z$ is an adjustable rod (shown in dotted lines) fixed to the stay-piece $A^2$ of the machine-frame and having at its lower end a stop $z^0$, adapted on the descent of the beam D to arrest one end of the bell-crank lever $z'$ and to turn the same on its center $z^{16}$ and travel the sliding rod $z^4$ against a spring $z^{10}$ through the medium of the block $z^3$ and friction-roller $z^{17}$. To the sliding rod $z^4$ is attached at each end a flexible band $z^5$, which passes around and is fixed at $z^6$ to a boss $z^{18}$ of the arm $z^{14}$. The spring $z^7$ keeps the brush constantly in contact with the work during its movement. The brush-arm $z^{14}$ has a notch $z^{13}$, adapted to engage a notch $z^8$ on a tappet-lever $z^{12}$. $z^9$ is a fixed stop-piece adapted to engage the tappet-lever $z^{12}$, as shown. In operation the descent of the beam D through the lever $z'$ oscillates the brush Z on the spindle $z^{11}$, and when it arrives at the end of its stroke the notch $z^8$ on lever $z^{12}$ engages with the notch $z^{13}$, which locks the brush-arm $z^{14}$ in position. The brush is then moved up again with the beam D; but on the roller $z^{25}$ on the lever $z^{12}$ coming in contact with the stop $z^9$ the brush is disengaged from the catch and returned sharply to its original position by means of a spring $z^{10}$ passing in its course over the work and cleaning the molding of shavings and the like.

What I claim, and desire to secure by Letters Patent, is—

1. The improved wood-carving machine comprising the combination of a reciprocating counterbalanced beam, a set of tool-holders carried and actuated by said beam, tool-holders carried by a horizontal slide and working horizontally and means for operating same from the driving-shafts, tool-holders carried by the machine-frame above the work-table and actuated by the movement of said reciprocating beam, a suitably-actuated tool-holder-carrying frame disposed and operated from below the work-table, tool-holders supported by said frame and actuated through suitable connections by the movement of said reciprocating beam the said frame serving to clear said tools from the work independently of the movement of the beam, at the time when the work is to be fed forward, a work-supporting table and carriages for raising and adjusting same, gripping-jaws at both ends of the work-table connected together by a longitudinal feed-bar so as to grip and reciprocate simultaneously and means for actuating said claws so as to grip and release the work and feed same forward intermittently all substantially as set forth.

2. The improved wood-carving machine comprising the combination of a reciprocating counterbalanced beam, a set of tool-holders carried and actuated by said beam, tool-holders carried by a horizontal slide and working horizontally and means for operating same from the driving-shafts, tool-holders carried by the machine-frame above the work-table and actuated by the movement of said reciprocating beam a suitably-actuated tool-holder-carrying frame disposed and operated from below the work-table, tool-holders supported by said frame and actuated through suitable connections by the movements of said reciprocating beam the said frame serving to clear said tool from the work independently of the movement of the beam at the time when the work is to be fed forward all substantially as set forth.

3. In wood-carving machines, the combination of a reciprocating beam carrying a number of tool-holders, a frame below the work-table, tool-holders mounted on said frame, means for actuating the tool-holders on said frame from the reciprocating beam, means for moving said frame below the work-table to raise and lower the tool-holders thereon irrespective of the movement of the reciprocating beam substantially as described.

4. In wood-carving machines the combination of a reciprocating beam D, tool-holders $T^4$, actuated from said beam, and a vertically-moving frame to which said tool-holders are pivoted, the arrangement being such that the beam actuates the tools for cutting longitudinally-curved portions of the work and the moving frame raises the tool-holder clear of the work, when the feed movement takes place.

5. In a wood-carving machine the feed mechanism comprising a table Q, feed-bar R sliding beneath said table, jaws S S' disposed at each end of the table and joined by and moving with the feed-bar R, means for actuating said jaws intermittently, and also means for reciprocating the feed-bar R intermittently at the proper time whereby the jaws grip the work which is then fed forward by the movement of the bar R, the jaws being then released before and during the return movement of the bar.

6. In wood-carving machines, the combination of a reciprocating beam, a number of tool-holders carried by said beam, a number of pressers carried by said beam for holding the work, a frame below the work-table, tools mounted on said frame, means for actuating the tool-holders on said frame from the reciprocating beam, means for moving said frame to raise and lower the tool-holders thereon irrespective of the movement of the reciprocating beam substantially as and for the purpose set forth.

7. In a wood-carving machine the brush-operating mechanism comprising the combination with the reciprocating beam D of a sliding bar $Z^4$ and means for actuating same from the beam D a flexible band $z^5$ carried by the bar $z^4$, a brush Z and an arm carrying same actuated by said flexible band, means for locking the brush-arm and releasing same at the proper time, all substantially as set forth.

In witness whereof I have hereunto signed my name in the presence of two subscribing witnesses.

LEON CONSTANT HENRI CHARRIER.

Witnesses:
 HENRY A. PRYOR,
 ALFRED B. CAMPBELL.